United States Patent
Umayabashi

(10) Patent No.: US 6,542,467 B2
(45) Date of Patent: *Apr. 1, 2003

(54) BANDWIDTH ALLOCATION SYSTEM OF VIRTUAL PATH IN COMMUNICATION NETWORK OF ASYNCHRONOUS TRANSFER MODE

(75) Inventor: Masaki Umayabashi, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,338

(22) Filed: Mar. 4, 1999

(65) Prior Publication Data

US 2003/0026290 A1 Feb. 6, 2003

(30) Foreign Application Priority Data

Mar. 5, 1998 (JP) .............................. 10-073402

(51) Int. Cl.[7] .............................. H04J 1/16; H04J 3/16
(52) U.S. Cl. ....................................... 370/236
(58) Field of Search ................................. 370/230, 235, 370/233, 232, 389, 397, 399, 231; 709/247, 249

(56) References Cited

U.S. PATENT DOCUMENTS

| | | | | |
|---|---|---|---|---|
| 5,153,877 A | * | 10/1992 | Esaki et al. | 370/389 |
| 5,313,454 A | * | 5/1994 | Bustini et al. | 370/231 |
| 5,333,131 A | * | 7/1994 | Tanabe et al. | 370/397 |
| 5,754,530 A | * | 5/1998 | Awdeh et al. | 370/236.1 |
| 5,812,525 A | * | 9/1998 | Teraslinna | 370/229 |
| 5,812,789 A | * | 9/1998 | Diaz et al. | 709/247 |
| 5,854,903 A | * | 12/1998 | Morrison et al. | 709/249 |
| 5,894,471 A | * | 4/1999 | Miyagi et al. | 370/230 |
| 5,982,748 A | * | 11/1999 | Yin et al. | 370/232 |
| 6,304,549 B1 | * | 10/2001 | Srinivasan et al. | 370/230 |

FOREIGN PATENT DOCUMENTS

| | | |
|---|---|---|
| JP | 6-209329 | 7/1994 |
| JP | 7-79252 | 3/1995 |
| JP | 11-17690 | 1/1999 |
| JP | 11-27284 | 1/1999 |

OTHER PUBLICATIONS

M. Umayabashi et al., "A Method of Dynamic Bandwidth Control in Multiplexing VPCs for ATM Subscriber Access Networks", *Proceedings of the 1998 IEICE General Conference*, Mar. 27–30, 1998, pp. 11.

* cited by examiner

Primary Examiner—Wellington Chin
Assistant Examiner—William Schultz
(74) Attorney, Agent, or Firm—Sughrue Mion, PLLC

(57) ABSTRACT

A node in an asynchronous transfer mode exchange network comprises a bandwidth monitor circuit for calculating a bandwidth used for a virtual path by measuring a cell amount entered into each virtual path, cell stored buffers for respectively storing an input cell for every virtual path, a bandwidth allocation control circuit for deciding a bandwidth allocation ratio, in accordance with a used bandwidth ratio obtained by reference to each bandwidth used for every virtual path from the bandwidth monitor circuit, depending on a change of the Queue length in a cell within the cell stored buffer, and an output bandwidth control circuit for controlling output of the respective cell stored buffers, in accordance with the bandwidth allocation ratio decided by the bandwidth allocation control circuit.

20 Claims, 7 Drawing Sheets

| CELL STORED BUFFER IDENTIFIER DESCRIBING UNIT | CELL STORED BUFFER STATE REGISTERING UNIT | CELL STORED BUFFER OUTPUT BANDWIDTH CONTROL UNIT |
|---|---|---|
| 1 | STATE B | 10M |
| 2 | STATE A | 20M |
| 3 | STATE B | 10M |
| 4 | STATE B | 8M |

BANDWIDTH ALLOCATION SYSTEM OF VIRTUAL PATH IN COMMUNICATION NETWORK OF ASYNCHRONOUS TRANSFER MODE

BACKGROUNDS OF THE INVENTION

1. Field of the Invention

The present invention relates to a bandwidth allocation system of a virtual path for allocating bandwidths for a plurality of virtual paths in a communication network of asynchronous transfer mode, and more particularly to a bandwidth allocation system of a virtual path capable of dynamically controlling a bandwidth allocation ratio depending on a bandwidth ratio adopted in the virtual paths.

2. Description of the Related Art

In an asynchronous transfer mode exchange for use in multi-media communication (hereinafter, referred to as ATM), a virtual path is established between ATM nodes, so to connect a virtual channel. A bandwidth of a virtual path which would be established depending on input traffic is usually fixed, in a large key network. However, when one ATM node accommodates only some hundreds of subscribers like a subscriber access line, a bandwidth used for a virtual path varies extremely, and therefore a bandwidth established for a virtual path would become greater, as contrasted with an average bandwidth generally used. Then, it is necessary to multiplex a plurality of virtual paths, so to make them effectively group, thereby absorbing fluctuation of a bandwidth of each virtual path so as to reduce the whole required bandwidths, in an ATM relay node for exchanging a plurality of virtual paths to transfer data to a physical medium.

In this case, since a bandwidth established for each virtual path is not assured completely, it is necessary to allocate a bandwidth dynamically depending on the necessity. This conventional technique for dynamic bandwidth allocation is disclosed in, for example, Japanese Patent Publication Laid-Open (Kokai) No. Heisei 6-209329, "Bandwidth Allocation Method for Virtual Path in Asynchronous Transfer Mode".

The structure of an AMT node for realizing the conventional dynamic bandwidth allocation method disclosed in the same publication will be described with reference to FIG. 8. As illustrated in FIG. 8, the ATM node 800 comprises a bandwidth monitor circuit 8000, a detecting circuit of excess of the upper threshold of Queue length 8010, a waiting time prediction circuit 8020, a bandwidth ratio allocation control circuit 8030, an output bandwidth control circuit 8040, and cell stored buffers 8050-1 to 8050-4 respectively established for virtual paths 8200-1 to 8200-4.

Cells to be transferred through the virtual paths 8200-1 to 8200-4 are supplied to the bandwidth monitor circuit 8000 via physical mediums 8060-1 to 8060-4. The bandwidth monitor circuit 8000 monitors input cells, calculates a bandwidth adopted to every virtual path 8200-1 to 8200-4, and transfers the cells to the corresponding cell stored buffers 8050-1 to 8050-4 respectively. The cell stored buffers 8050-1 to 8050-4 respectively holding the upper thresholds TH-1 to TH-4 of the Queue length store the input cells and supply the input cells to a physical medium 8070 according to the output bandwidths established by the output bandwidth control circuit 8040.

The Queue length of a cell stored buffer 8050-i (i=1, 2, 3, 4) is always monitored by the Queue length upper threshold excess detecting circuit 8010. When the Queue length becomes equal to the upper threshold TH-i, the Queue length upper threshold excess detecting circuit 8010 sends a control signal 8100 to the bandwidth ratio allocation control circuit 8030. This processing by the Queue length upper threshold detecting circuit 8010 enables detection of congestion in a cell stored buffer. In the conventional technique disclosed in the same publication, the waiting time prediction circuit 8020 is adopted to detect the congestion of a cell stored buffer by calculating the waiting time of each cell within the cell stored buffers 8050-1 to 8050-4, in order to detect the congestion in a cell stored buffer assuredly. The waiting time prediction circuit 8020 calculates the waiting time of each cell within the cell stored buffers 8050-1 to 8050-4, according to the bandwidth used for each virtual path 8200-1 to 8200-4 obtained by reference to the bandwidth monitor circuit 8000 and the output bandwidth of each cell stored buffer 8050-1 to 8050-4 obtained by reference to the output bandwidth control circuit 8040. When the calculated waiting time exceeds a predetermined allowance, a control signal 8110 is sent to the bandwidth ratio allocation control circuit 8030. The bandwidth ratio allocation control circuit 8030, upon receipt of the both control signals 8100 and 8110, refers to the current bandwidth information of the virtual paths 8200-1 to 8200-4 from the bandwidth monitor circuit 8000, regards the current bandwidth ratio as the bandwidth allocation ratio, and notifies the output bandwidth control circuit 8040 of the bandwidth allocation ratio by use of a control signal 8120. While, the output bandwidth control circuit 8040, upon receipt of the control signal 8120, calculates each output bandwidth of the cell stored buffers 8050-1 to 8050-4 according to the received bandwidth allocation ratio and modifies the output bandwidth depending on the necessity. A cell stored buffer 8050-1, 2, 3, or 4 having the modified output bandwidth supplies the cell within the same buffer to the physical medium 8070 in accordance pith the modified output bandwidth.

The above-mentioned conventional ATM node is defective in requiring too much processing amount of bandwidth allocation control when the Queue length of a cell stored buffer becomes equal to the upper threshold.

More specifically, in allocating an output bandwidth of each cell stored buffer when the Queue length of a cell stored buffer becomes equal to the upper threshold, the conventional ATM node regards the transmission bandwidth of a physical medium on the output side as a bandwidth to be allocated and allocates this bandwidth as the output bandwidth of each cell stored buffer according to a current bandwidth ratio of each virtual path entered into each cell stored buffer. In this case, since the output bandwidth of a cell stored buffer is allocated equally to the bandwidth used for a virtual path entered into the cell stored buffer, the Queue length remains around the upper threshold thereof. Therefore, fluctuation of the bandwidth used for a virtual path entered into a cell stored buffer may increase the opportunity of the Queue length becoming equal to the upper threshold, resulting in an increase of the processing amount of bandwidth allocation control.

SUMMARY OF THE INVENTION

A first object of the present invention is to provide a bandwidth allocation system of a virtual path in a communication network of asynchronous transfer mode, which is able to reduce the processing amount of bandwidth allocation control when the Queue length of a cell stored buffer becomes equal to the upper threshold thereof.

A second object of the present invention is to provide a bandwidth allocation system of a virtual path in a communication network of asynchronous transfer mode capable of making effective use of bandwidth among cell stored buffers, as well as reducing the processing amount of bandwidth allocation control when the Queue length of a cell stored buffer becomes equal to the upper threshold thereof.

According to the first aspect of the invention, a bandwidth allocation system of a virtual path for allocating bandwidths for a plurality of virtual paths in a communication network of asynchronous transfer mode, wherein a node in the asynchronous transfer mode network comprises bandwidth monitor means for calculating a bandwidth used for a virtual path by measuring a cell amount entered into each virtual path, cell storing means for storing the input cell for every virtual path, bandwidth allocation control means for deciding a bandwidth allocation ratio for output bandwidths in accordance with a used bandwidth ratio obtained by reference to each bandwidth used for every virtual path from the bandwidth monitor means depending on a change of the Queue length in the cell within the cell storing means, and output bandwidth control means for controlling output of the respective cell storing means, in accordance with the bandwidth allocation ratio decided by the bandwidth allocation control means.

In the preferred construction, the bandwidth allocation control means allocates an output bandwidth much more than a used bandwidth with respect to the cell storing means in which the increasing Queue length of the cell exceeds a predetermined value.

In another preferred construction, an upper threshold of cell storing amount in the cell storing means is established, and the bandwidth allocation control means, referring to a bandwidth used for each virtual path from the bandwidth monitor means, decides a bandwidth allocation ratio of output bandwidths with weight added thereto according to the used bandwidth ratio, when the Queue length of a cell within the cell storing means exceeds the upper threshold.

In another preferred construction, an upper threshold of cell storing amount in the cell storing means is established, and the bandwidth allocation control means includes Queue length upper threshold excess detecting means, monitoring the Queue length of a cell within the cell storing means, for supplying a detection signal when the increasing Queue length exceeds the upper threshold, and decides a bandwidth allocation ratio of output bandwidths with weight added thereto according to a used bandwidth ratio obtained by reference to each bandwidth used for every virtual path from the bandwidth monitor means, in reply to the detection signal from the Queue length upper threshold excess detecting means.

In another preferred construction, the bandwidth allocation control means allocates an output bandwidth much more than a used bandwidth with respect to the cell storing means in which the increasing Queue length exceeds a predetermined value, and after providing the above-mentioned cell storing means with a much more output bandwidth, surplus bandwidth allocation to the cell storing means is released when the Queue length of the cell in the cell storing means is reduced to a predetermined value.

According to the second aspect of the invention, a bandwidth allocation system of a virtual path for allocating bandwidths for a plurality of virtual paths in a communication network of asynchronous transfer mode, wherein a node in the asynchronous transfer mode network comprises bandwidth monitor means for calculating a bandwidth used for a virtual path by measuring a cell amount entered into each virtual path, cell storing means for storing the input cell for every virtual path, bandwidth allocation control means for deciding a bandwidth allocation ratio for output bandwidths in accordance with a used bandwidth ratio obtained by reference to each bandwidth used for every virtual path from the bandwidth monitor means depending on a change of the Queue length in the cell within the cell storing means, and output bandwidth control means for controlling output of the respective cell storing means, in accordance with the bandwidth allocation ratio decided by the bandwidth allocation control means, an upper threshold and a lower threshold of a cell storing amount in the cell storing means are established, and the bandwidth allocation control means includes bandwidth weight allocation control means for deciding a bandwidth allocation ratio of output bandwidths, with weight added thereto according to a used bandwidth ratio obtained by reference to each bandwidth used for every virtual path from the bandwidth monitor means, when the Queue length of a cell within the cell storing means exceeds the upper threshold, and bandwidth ratio allocation control means, after decision of the bandwidth allocation ratio by the bandwidth weight allocation control means and output control of the respective cell storing means by the output bandwidth control means, for deciding a bandwidth allocation ratio of output bandwidths in accordance with a used bandwidth ratio obtained by reference to each bandwidth used for every virtual path from the bandwidth monitor means, when the Queue length arrives at the lower threshold.

In the preferred construction, the bandwidth allocation control means includes

Queue length upper threshold excess detecting means, monitoring the Queue length of a cell within the cell storing means, for supplying a detection signal when the increasing Queue length exceeds the upper threshold, bandwidth weight allocation control means for deciding a bandwidth allocation ratio of output bandwidths, with weight added thereto according to a used bandwidth ratio obtained by reference to each bandwidth used for every virtual path from the bandwidth monitor means, in reply to the detection signal from the Queue length upper threshold excess detecting means, Queue length lower threshold arrival detecting means, monitoring the Queue length of a cell within the cell storing means, for supplying a detection signal when the Queue length is reduced to the lower threshold, after decision of the bandwidth allocation ratio by the bandwidth weight allocation control means and output control of the respective cell storing means by the output bandwidth control means, and bandwidth ratio allocation control means for deciding a bandwidth allocation ratio of output bandwidths in accordance with a used bandwidth ratio obtained by reference to each bandwidth used for every virtual path from the bandwidth monitor means, in reply to the detection signal from the Queue length lower threshold arrival detecting means.

In another preferred construction, the bandwidth allocation control means includes Queue length upper threshold excess detecting means, monitoring the Queue length of a cell within the cell storing means, for supplying a detection signal when the increasing Queue length exceeds the upper threshold, bandwidth weight allocation control means for deciding a bandwidth allocation ratio of output bandwidths, with weight added thereto according to a used bandwidth ratio obtained by reference to each bandwidth used for every virtual path from the bandwidth monitor means, in reply to the detection signal from the Queue length upper threshold excess detecting means, Queue length lower threshold arrival detecting means, monitoring the Queue length of a cell within the cell storing means, for supplying a detection signal when the Queue length is reduced to the lower threshold, after decision of the bandwidth allocation ratio by the bandwidth weight allocation control means and output control of the respective cell storing means by the output bandwidth control means, bandwidth ratio allocation control means for deciding a bandwidth allocation ratio of output bandwidths in accordance with a used bandwidth ratio obtained by reference to each bandwidth used for every virtual path from the bandwidth monitor means, in reply to the detection signal from the Queue length lower threshold arrival detecting means, and further includes state control means for controlling state of the Queue length of a cell within the cell storing means;

the state of the cell storing means controlled by the state control means is changed according to the detection results of the Queue length upper threshold excess detecting means and the Queue length lower threshold arrival detecting means; and the bandwidth weight allocation control means and the bandwidth ratio allocation control means judge whether decision processing of a bandwidth allocation ratio should be performed or not, with reference to the state of the cell storing means controlled by the state control means.

In another preferred construction, the state control means stores identification information for identifying the cell storing means, information indicating whether the Queue length is reduced to the lower threshold or not after once getting equal to the upper threshold, in every identification information, and information indicating an output bandwidth.

According to another aspect of the invention, a bandwidth allocation system of a virtual path for allocating bandwidths for a plurality of virtual paths in a communication network of asynchronous transfer mode, wherein a node in the asynchronous transfer mode network comprises a bandwidth monitor for calculating a bandwidth used for a virtual path by measuring a cell amount entered into each virtual path, a cell stored buffer for storing an input cell for every virtual path, a bandwidth allocation control circuit for deciding a bandwidth allocation ratio for output bandwidths in accordance with a used bandwidth ratio obtained by reference to each bandwidth used for every virtual path from the bandwidth monitor depending on a change of the Queue length in the cell within the cell stored buffer, and an output bandwidth control circuit for controlling output of the respective cell stored buffers, in accordance with the bandwidth allocation ratio decided by the bandwidth allocation control circuit.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, the outline of an asynchronous transfer mode exchange node (ATM node) according to a first embodiment of the present invention will be described. The ATM node of the embodiment comprises a Queue length upper threshold excess detecting circuit, a bandwidth weight allocation control circuit, a bandwidth monitor circuit, and cell stored buffers. The bandwidth weight allocation control circuit, upon receipt of a control signal from the Queue length upper threshold excess detecting circuit, refers to a bandwidth used for every virtual path from the bandwidth monitor circuit, and determines the bandwidth allocation ratio based on this used bandwidth ratio.

When the bandwidth weight allocation control circuit is notified by the Queue length upper threshold excess detecting circuit that the Queue length of a given cell stored buffer becomes equal to the upper threshold thereof, in the ATM node of the embodiment, it multiplies the current bandwidth of the given cell stored buffer by $\alpha(\alpha>1.0)$ and thus determines the bandwidth allocation ratio according to the current bandwidth ratio of virtual paths corresponding to the respective cell stored buffers. As a result, a cell stored buffer having the Queue length equal to the upper threshold is provided with an output bandwidth more than the current bandwidth.

Figure 1:
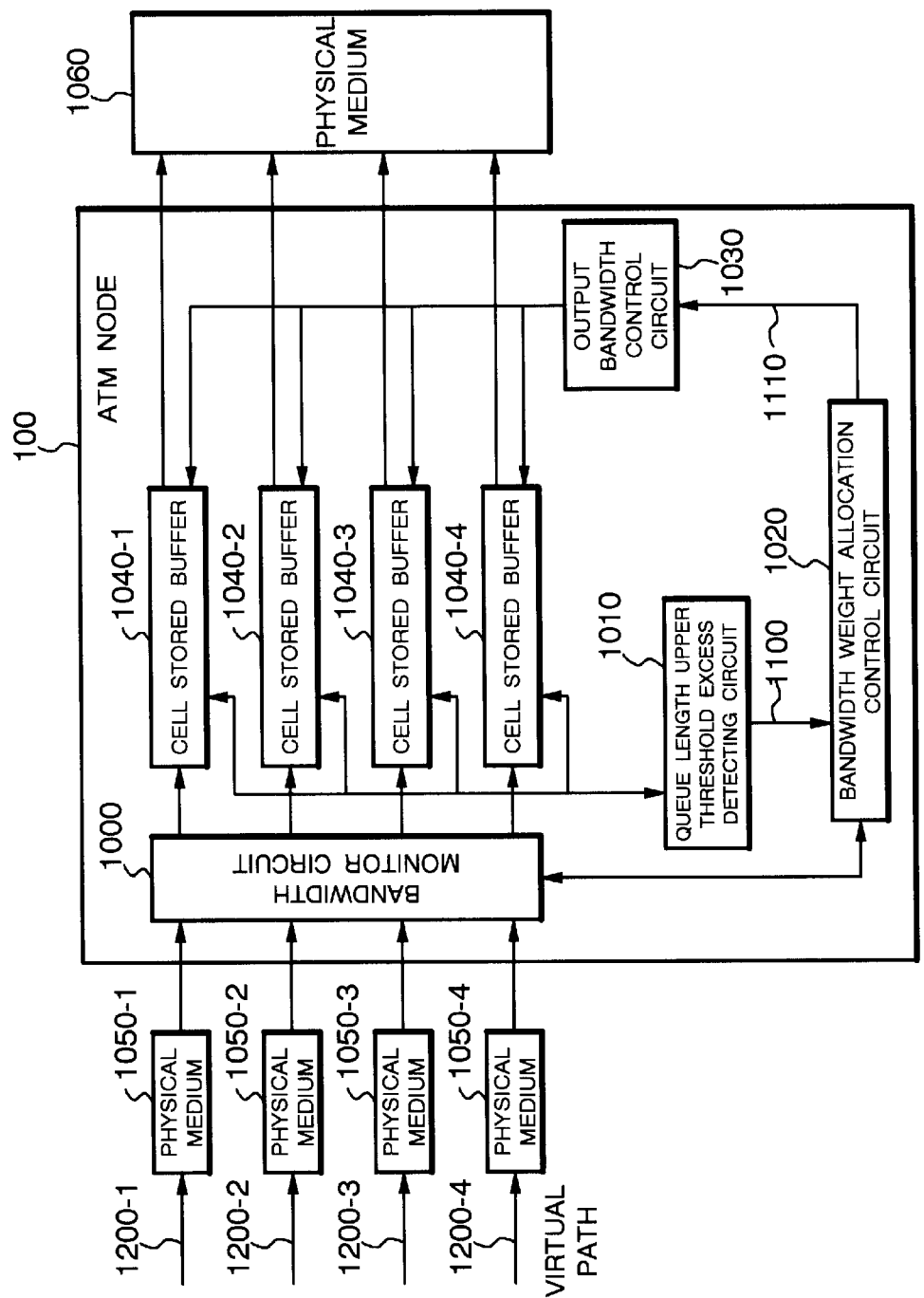
FIG. 1 is a block diagram showing the structure of an asynchronous transfer mode exchange node (ATM node) according to a first embodiment of the present invention.

FIG. 1 is a block diagram showing the structure of the ATM node of the first embodiment of the present invention. With reference to FIG. 1, the ATM node 100 of the present invention comprises a bandwidth monitor circuit 1000, a Queue length upper threshold excess detecting circuit 1010, a bandwidth weight allocation control circuit 1020, an output bandwidth control circuit 1030, and cell stored buffers 1040-1 to 1040-4 respectively established for virtual paths 1200-1 to 1200-4. FIG. 1 shows only the characteristic structure of the present invention and the description of the other general structure is omitted.

Cells to be transferred through the virtual paths 1200-1 to 1200-4 are supplied to the bandwidth monitor circuit 1000 via physical mediums 1050-1 to 1050-4.

The bandwidth monitor circuit 1000 monitors input cells, calculates a bandwidth adopted to every virtual path 1200-1 to 1200-4, and transfers the cells to the corresponding cell stored buffers 1040-1 to 1040-4.

The cell stored buffers 1040-1 to 1040-4 respectively store the corresponding input cells and supply the cells to a physical medium 1060 according to each output bandwidth of the cell stored buffers 1040-1 to 1040-4 controlled by the output bandwidth control circuit 1030. The cell stored buffers 1040-1 to 1040-4 are respectively provided with the upper thresholds T-1 to T-4 of the Queue length.

Detecting that the increasing Queue length of a cell stored buffer 1040-i (i=1, 2, 3, 4) becomes equal to the upper threshold T-i, the Queue length upper threshold excess detecting circuit 1010 sends a control signal 1100 to the bandwidth weight allocation control circuit 1020.

The bandwidth weight allocation control circuit 1020 increases the current bandwidth of the cell stored buffer 1040-i according to the control signal 1100 and determines a bandwidth allocation ratio according to the current bandwidth ratio of the virtual paths corresponding to each cell stored buffer 1040-i.

The processing of the bandwidth weight allocation control circuit 1020 will be described with reference to FIG. 4. Upon receipt of the control signal 1100, the bandwidth weight allocation control circuit 1020 refers to the current bandwidth information of the virtual paths 1200-1 to 1200-4 from the bandwidth monitor circuit 1000 (Step 401).

With respect to the cell stored buffer 1040-i having the Queue length equal to the upper threshold T-i, the actual bandwidth thereof is multiplied by $\alpha(\alpha$: weighted coefficient $(\alpha>1.0))$ so that the output bandwidth of the same cell stored buffer 1040-i should exceed the bandwidth used for the virtual path 1200-i corresponding to the same cell stored buffer, which is defined as a new, bandwidth. According to a new bandwidth ratio of the virtual paths 1200-1 to 1200-4, the control circuit 1020 determines the bandwidth allocation ratio (Step 402). For example, when the increasing Queue length of the cell stored buffer 1040-2 becomes equal to the upper threshold T-2, if the respective bandwidths of the virtual paths 1200-1 to 1200-4 are 20M, 40M, 20M, and 20M, the bandwidth weight allocation control circuit 1020 determines the bandwidth allocation ratio of the virtual paths 1200-1 to 1200-4 as $20:40\times\alpha:20:20$.

Next, the bandwidth weight allocation control circuit 1020 calculates output bandwidths of the cell stored buffers 1040-1 to 1040-4 according to the bandwidth allocation ratio, with a transmission bandwidth of the physical medium 1060 regarded as a bandwidth to be allocated (Step 403). The control circuit 1020 notifies the output bandwidth control circuit 1030 of the output bandwidths by use of the control signal 1110 (Step 404).

Upon receipt of the control signal 1110, the output bandwidth control circuit 1030 supplies the cells within the cell stored buffers 1040-1 to 1040-4 to the physical medium 1060 according to the received output bandwidths.

As mentioned above, the ATM node of the embodiment establishes the upper threshold of the Queue length in a cell stored buffer, determines the bandwidth allocation ratio, with a cell stored buffer having the Queue length equal to the upper threshold weighted by $\alpha$ times of the bandwidth thereof, and provides each output bandwidth, thereby enabling proper bandwidth allocation suitable for the current state of virtual paths.

This time, the outline of an ATM node according to the second embodiment of the present invention will be described. The ATM node of the embodiment comprises a Queue length upper threshold excess detecting circuit, a Queue length lower threshold arrival detecting circuit, a bandwidth weight allocation control circuit, a bandwidth ratio allocation control circuit, a bandwidth monitor circuit, cell stored buffers, and a cell stored buffer state control circuit. Upon receipt of a control signal from the Queue length upper threshold excess detecting circuit, the bandwidth weight allocation control circuit determines a cell stored circuit to be allocated with reference to the cell stored buffer state control circuit, obtains a bandwidth used for every virtual path corresponding to the allocated cell stored buffer with reference to the bandwidth monitor circuit, and determines a bandwidth allocation ratio according to the current bandwidth ratio. The bandwidth ratio allocation control circuit, upon receipt of the control signal from the Queue length lower threshold arrival detecting circuit, determines a cell stored buffer to be re-allocated with reference to the cell stored buffer state control circuit, obtains a bandwidth used for every virtual path corresponding to the re-allocated cell stored buffer with reference to the bandwidth monitor circuit, and determines a bandwidth allocation ratio according to the current bandwidth ratio.

Thus, in the ATM node of the embodiment, the bandwidth weight allocation control circuit notified by the Queue length upper threshold excess detecting circuit that the Queue length of a given cell stored buffer has got equal to the upper threshold regards the whole cell stored buffers or some cell stored buffers (one or more) including the cell stored buffer having the Queue length equal to the upper threshold, as a cell stored buffer to be allocated. Thereafter, with respect to a virtual path only corresponding to a cell stored buffer in which the Queue length is not reduced to the lower threshold after being increased to be equal to the upper threshold, of the cell stored buffers to be allocated, the actual bandwidth is multiplied by α(α>1.0) as a new bandwidth, and a bandwidth allocation ratio is determined according to the bandwidth ratio of the virtual paths corresponding to the cell stored buffer to be allocated. As a result, a cell stored buffer in which the Queue length is not reduced to the lower threshold after being increased to be equal to the upper threshold is provided with an output bandwidth more than the actual bandwidth.

The bandwidth ratio allocation control circuit notified by the Queue length lower threshold arrival detecting circuit that the Queue length of a given cell stored buffer exceeds the upper threshold and thereafter it is reduced to the lower threshold, regards a cell stored buffer other than the cell stored buffer in which the Queue length is not reduced to the lower threshold after being increased to be equal to the upper threshold, as a cell stored buffer to be re-allocated. Then, it determines the bandwidth allocation ratio according to the actual bandwidth ratio of the virtual paths corresponding to the cell stored buffer to be re-allocated. As a result, surplus of the output bandwidth of the cell stored buffer having the Queue length decreasing to the lower threshold after exceeding the upper threshold is released and the surplus output bandwidth is re-allocated to another cell stored buffer.

Figure 2:
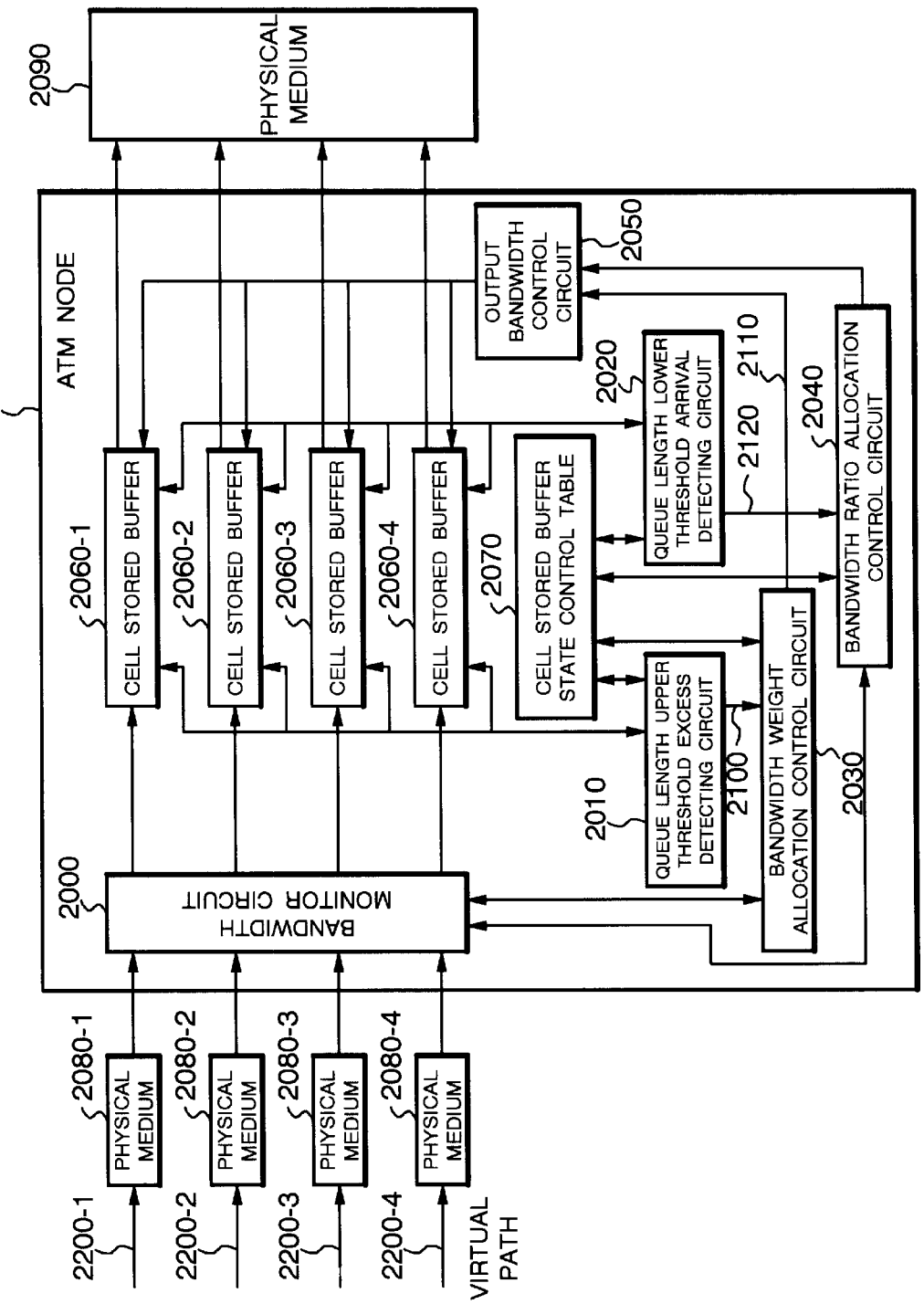
FIG. 2 is a block diagram showing the structure of an asynchronous transfer mode exchange node (ATM node) according to a second embodiment of the present invention.

FIG. 2 is a block diagram showing the structure of the ATM node according to the second embodiment of the present invention. With reference to FIG. 2, the ATM node 200 comprises a bandwidth monitor circuit 2000, a Queue length upper threshold excess detecting circuit 2010, a Queue length lower threshold arrival detecting circuit 2020, a bandwidth weight allocation control circuit 2030, a bandwidth ratio allocation control circuit 2040, an output bandwidth control circuit 2050, a cell stored buffer state control table 2070, and cell stored buffers 2060-1 to 2060-4 respectively established for virtual paths 2200-1 to 2200-4. FIG. 2 shows only the characteristic structure of the present invention and the description of the other general structure is omitted.

Cells to be transferred through the virtual paths 2200-1 to 2200-4 are supplied to the bandwidth monitor circuit 2000 via the physical mediums 2080-1 to 2080-4.

The bandwidth monitor circuit 2000 monitors input cells, calculates each bandwidth adopted for the virtual paths 2200-1 to 2200-4, and respectively transfers the cells to the corresponding cell stored buffers 2060-1 to 2060-4.

The cell stored buffers 2060-1 to 2060-4 store the corresponding input cells and respectively supply the cells to the physical medium 2090 according to the output bandwidths of the cell stored buffers 2060-1 to 2060-4 controlled by the output bandwidth control circuit 2050. The cell stored buffers 2060-1 to 2060-4 are respectively provided with the Queue length upper thresholds T2-1 to T2-4 and the Queue length lower thresholds T1-1 to T1-4.

Detecting that the increasing Queue length of a cell stored buffer 2060-i (i=1, 2, 3, 4) becomes equal to the upper threshold T2-i, the Queue length upper threshold excess detecting circuit 2010 establishes as the state A, the state of the cell stored buffer 2060-i in the cell stored buffer state control table 2070 which controls the state of each cell stored buffer 2060-1 to 2060-4.

Figures 3, 4:
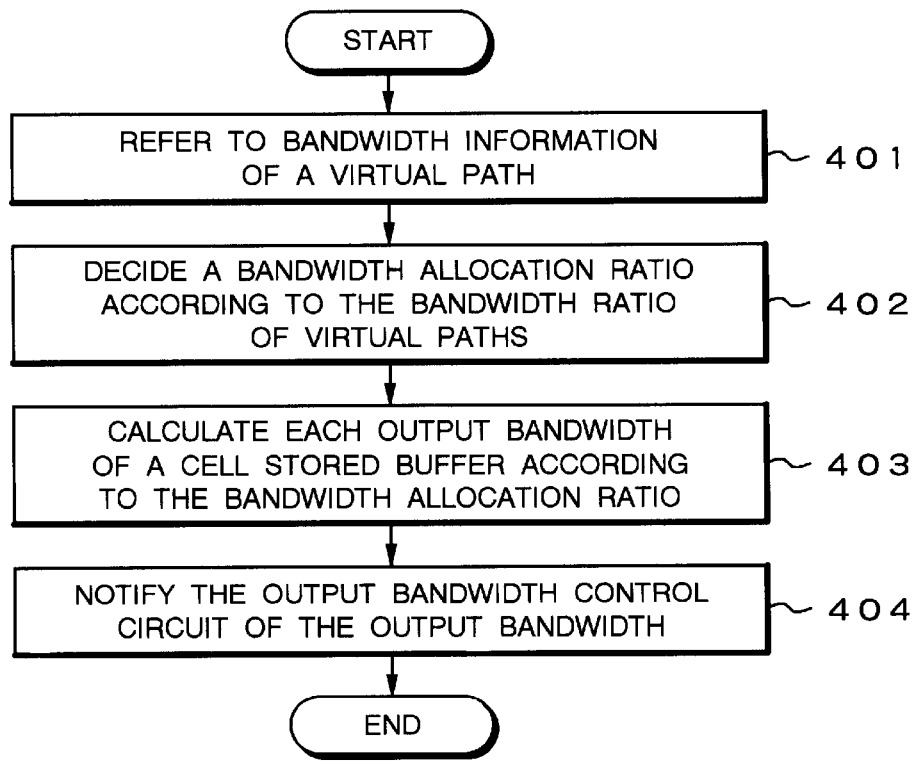
FIG. 3 is a view showing a state control table of a cell stored buffer in the second embodiment.
FIG. 4 is a flow chart showing the operation of a bandwidth weight allocation control circuit in the first embodiment.

As illustrated in FIG. 3, the cell stored buffer state control table 2070 consists of a cell stored buffer identifier describing unit 3000, a cell stored buffer state registering unit 3010, and a cell stored buffer output bandwidth control unit 3020.

The cell stored buffer state registering unit 3010 of the cell stored buffer state control table 2070 stores the states of the respective cell stored buffers 2060-1 to 2060-4 corresponding to the respective identifiers 1 to 4 within the cell stored buffer identifier describing unit 3000. The cell stored buffer output bandwidth control unit 3020 stores the output bandwidth information of the respective cell stored buffers 2060-1 to 2060-4. The state of a cell stored buffer is registered in the cell stored buffer state control table 2070. This state of a cell stored buffer is defined as the state where the Queue length is not reduced to the lower threshold T1-i after once getting equal to the upper threshold T2-i (hereinafter, referred to as the state A) and the state other than this (hereinafter, referred to as the state B).

After registering the state of a cell stored buffer 2060-i, the Queue length upper threshold excess detecting circuit 2010 notifies the bandwidth weight allocation control circuit 2030 of the identifier i of the cell stored buffer 2060-i having the Queue length equal to the upper threshold T2-i newly by use of a control signal 2100.

The bandwidth weight allocation control circuit 2030 provides the cell stored buffer 2060-i having the Queue length which is not reduced to the lower threshold after getting equal to the upper threshold, with an output bandwidth more than the actual bandwidth.

Figure 5:
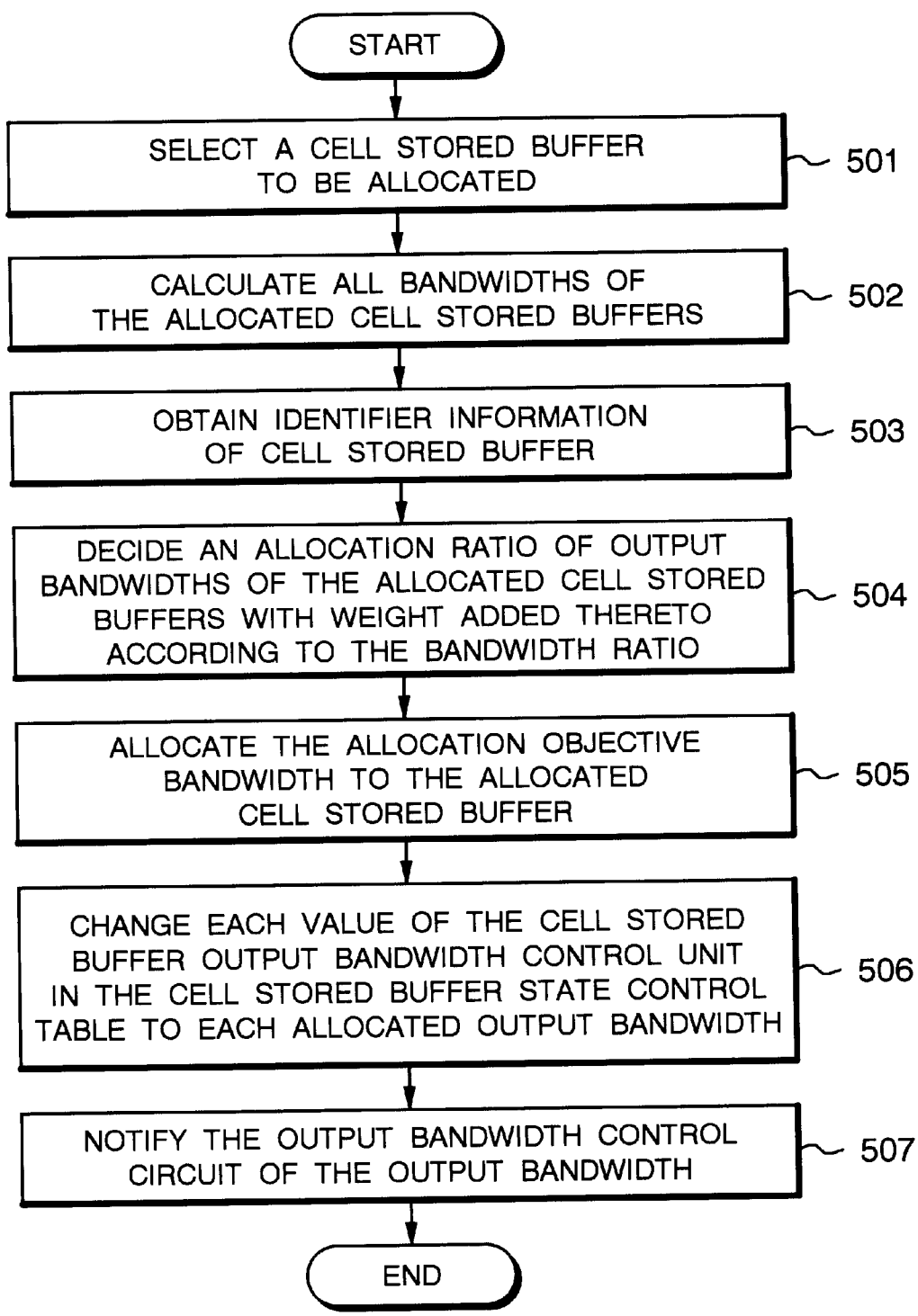
FIG. 5 is a flow chart showing the operation of a bandwidth weight allocation control circuit in the second embodiment.

The processing of the bandwidth weight allocation control circuit 2030 will be described with reference to FIG. 5. Upon receipt of the control signal 2100, the bandwidth weight allocation control circuit 2030 regards the whole cell stored buffers or some cell stored buffers of 2060-1 to 2060-4 including the cell stored buffer 2060-i newly having the Queue length equal to the upper threshold T2-i, as a cell stored buffer to be allocated (Step 501). By way of example, a cell stored buffer of 2060-1 to 2060-4 newly having the Queue length equal to the upper threshold T2-i and all the cell stored buffers in the state B of 2060-1 to 2060-4 are defined as the cell stored buffers to be allocated.

Thereafter, the bandwidth weight allocation control circuit 2030 obtains each output bandwidth information of the allocated cell stored buffers of 2060-1 to 2060-4, with reference to the cell stored buffer state control table 2070 and calculates the whole bandwidths (the whole bandwidths are, hereinafter, referred to as an objective bandwidth) (Step 502).

Further, it obtains identifier information of all the cell stored buffers in the state A of 2060-1 to 2060-4, with reference to the cell stored buffer state control table 2070 (Step 503). Thereafter, with reference to the bandwidth monitor circuit 2000, it obtains bandwidth information of the virtual paths 2200-1 to 2200-4 to be entered in the objective cell stored buffers of 2060-1 to 2060-4.

With respect to only the cell stored buffer in the state A, of the objective cell stored buffers of 2060-1 to 2060-4, the actual bandwidth is multiplied by α(α: weighted coefficient (α>1.0)), as a new bandwidth, and an allocation ratio of output bandwidths toward the objective cell stored buffers of 2060-1 to 2060-4 is determined according to the bandwidth ratio thereof (Step 504).

The bandwidth weight allocation control circuit 2030 allocates the objective bandwidth to the objective cell stored buffers of 2060-1 to 2060-4 according to the decided allocation ratio (Step 505). Each value of bandwidth information in the cell stored buffer output bandwidth control unit 3020 of the cell stored buffer state control table 2070 is changed to each value of the allocated output bandwidth (Step 506). Thereafter, by the use of a control signal 2110, it notifies the output bandwidth control circuit 2050 of each allocated bandwidth (Step 507).

The output bandwidth control circuit 2050, upon receipt of the control signal 2110, supplies the cells within the cell stored buffers 2060-1 to 2060-4 to the physical medium 2090 in accordance with the received bandwidths.

Figure 6:
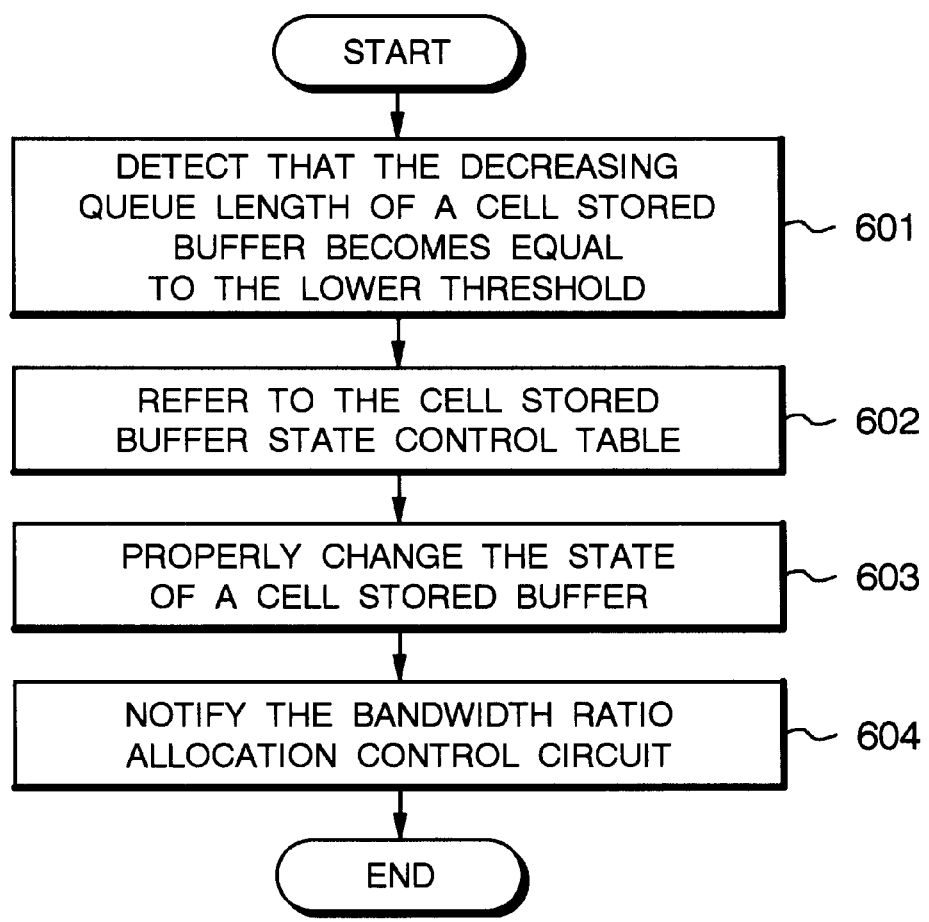
FIG. 6 is a flow chart showing the operation of a Queue length lower threshold arrival detecting circuit in the second embodiment.

The Queue length lower threshold arrival detecting circuit 2020 decides whether the output bandwidth toward a cell stored buffer should be re-allocated or not by the bandwidth ratio allocation control circuit 2040. The processing by the Queue length lower threshold arrival detecting circuit 2020 will be described with reference to FIG. 6.

When the Queue length of a cell stored buffer 2060-i is reduced to be equal to the lower threshold T1-i, the Queue length lower threshold arrival detecting circuit 2020 refers to the cell stored buffer state control table 2070 (Step 602), upon detection of this (Step 601). As a result, when the state of the cell stored buffer 2060-i is in the state A, it is changed to be in the state B (Step 603). Then, a control signal 2120 is notified to the bandwidth ratio allocation control circuit 2040 (Step 604).

Figure 7:
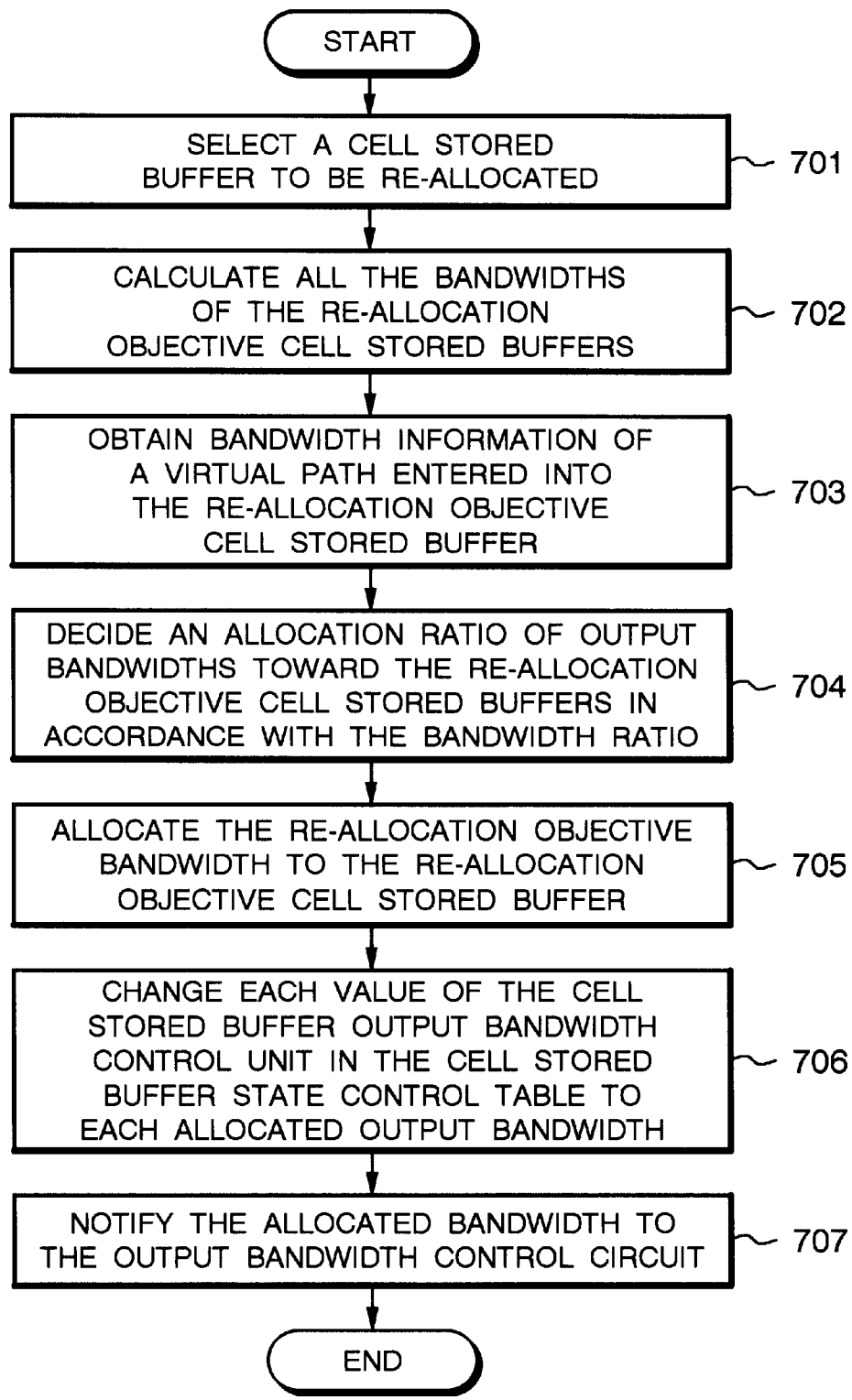
FIG. 7 is a flow chart showing the operation of a bandwidth ratio allocation control circuit in the second embodiment.
Figure 8:
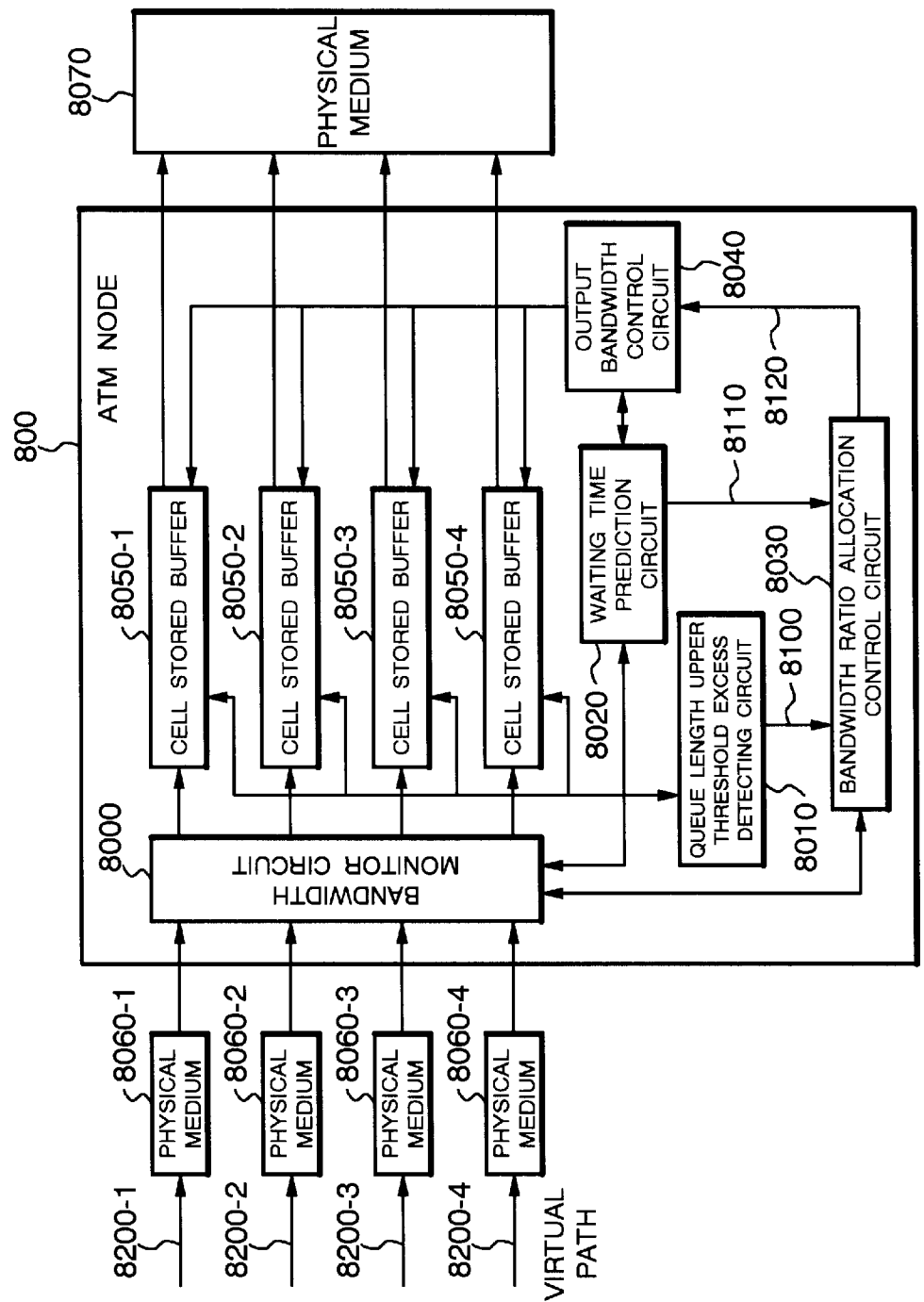
FIG. 8 is a block diagram showing the structure of the conventional asynchronous transfer mode exchange node (ATM node).

The bandwidth ratio allocation control circuit 2040 releases the surplus of the output bandwidth of the cell stored buffer 2060-i having the Queue length reduced to the lower threshold after exceeding the upper threshold, in reply to the notice from the Queue length lower threshold arrival detecting circuit 2020, and the surplus output bandwidth is allocated again to another cell stored buffer 2060-i. The processing of the bandwidth ratio allocation control circuit 2040 will be described with reference to FIG. 7.

Upon receipt of the control signal 2120, the bandwidth ratio allocation control circuit 2040 refers to the cell stored buffer state control table 2070, regards all the cell stored buffers in the state B of 2060-1 to 2060-4 as re-allocation objective cell buffers (Step 701), and calculates the whole bandwidths of all the output bandwidths thereof (hereinafter, the whole bandwidths are referred to as a re-allocation objective bandwidth) (Step 702).

Thereafter, the control circuit 2040 obtains each bandwidth information used for the virtual paths 2200-1 to 2200-4 to be entered into the re-allocation objective cell stored buffers of 2060-1 to 2060-4, with reference to the bandwidth monitor circuit 2000 (Step 703). The bandwidth ratio allocation control circuit 2040 determines an allocation ratio of the output bandwidths toward the re-allocation objective cell stored buffers of 2060-1 to 2060-4 in accordance with the bandwidth ratio thereof (Step 704).

The bandwidth ratio allocation control circuit 2040 allocates the re-allocation objective bandwidth to the respective re-allocation objective cell stored buffers of 2060-1 to 2060-4 according to the decided allocation ratio (Step 705). Each value of the bandwidth information in the cell stored buffer output bandwidth control unit 3020 of the cell stored buffer state control table 2070 is changed to the value of the allocated output bandwidth (Step 706). Thereafter, it notifies the output bandwidth control circuit 2050 of each allocated bandwidth by use of a control signal 2130 (Step 707).

The output bandwidth control circuit 2050, upon receipt of the control signal 2130, supplies the cells within the cell stored buffers 2060-1 to 2060-4 to the physical medium 2090 according to the received bandwidths.

As mentioned above, the ATM node of this embodiment establishes the upper threshold and the lower threshold of the Queue length in a cell stored buffer. When detecting that the increasing Queue length of a cell stored buffer becomes equal to the upper threshold, it determines the bandwidth allocation ratio, with the bandwidth thereof weighted by $\alpha$ times, and allocates each output bandwidth in accordance with the ratio. While, when detecting that the Queue length of a cell stored buffer is reduced to the lower threshold after once exceeding the upper threshold, it determines the bandwidth allocation ratio in accordance with the bandwidth ratio at the time, and allocates each output bandwidth according to the ratio. This enables proper bandwidth re-allocation suitable for the current state of virtual paths.

As set forth hereinabove, the asynchronous transfer mode exchange node (ATM node) of the present invention is effective in decreasing the amount of bandwidth allocation control processing of an output bandwidth of a cell stored buffer.

More specifically, in the first embodiment, the bandwidth weight allocation control circuit determines the bandwidth allocation ratio based on the respective current bandwidths, in allocating the output bandwidth of each cell stored buffer. At this time, the bandwidth weight allocation control circuit multiplies the current bandwidth by $\alpha(\alpha>1.0)$ with respect to a virtual path corresponding to a cell stored buffer having the Queue length equal to the upper threshold and allocates a much more bandwidth to the corresponding cell stored buffer relative to the virtual path. Therefore, decrease in the Queue length of the cell stored buffer is promoted, thereby inhibiting the Queue length from remaining around the upper threshold. This results in reducing the amount of bandwidth allocation control processing required when the Queue length becomes the upper threshold.

The asynchronous transfer mode exchange node (ATM node) of the present invention is effective in making good use of bandwidth among respective cell stored buffers, as well as reducing the amount of bandwidth allocation control processing of the output bandwidth of a cell stored buffer.

More specifically, in the second embodiment, the bandwidth weight allocation control circuit determines a bandwidth allocation ratio based on the current bandwidths, in allocating the output bandwidth of each cell stored buffer. At this time, the bandwidth weight allocation control circuit multiplies the current bandwidth by $\alpha(\alpha>1.0)$ with respect to a virtual path corresponding to a cell stored buffer having the Queue length equal to the upper threshold and allocates a much more bandwidth to the corresponding cell stored buffer relative to the virtual path. Therefore, decrease in the Queue length of the cell stored buffer is promoted, thereby inhibiting the Queue length from remaining around the upper threshold. This results in reducing the amount of bandwidth allocation control processing required when the Queue length becomes the upper threshold.

The bandwidth ratio allocation control circuit determines a bandwidth allocation ratio based on the current bandwidths without any weighting, in allocating the output bandwidth of each cell stored buffer. This releases the surplus of the output bandwidth of a cell stored buffer which has been provided by the bandwidth weight allocation control circuit, which is allocated to another cell stored buffer. As a result, bandwidth can be effectively used among respective cell stored buffers by allocating the released bandwidth therebetween when another cell stored buffer is short of output bandwidth.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A bandwidth allocation system of a virtual path for allocating bandwidths for a plurality of virtual paths in a communication network of asynchronous transfer mode, wherein a node in said asynchronous transfer mode network comprises:

bandwidth monitor means for calculating a bandwidth used for a virtual path by measuring a cell amount entered into each virtual path;

cell storing means for storing an input cell for each of said plurality of virtual paths;

bandwidth allocation control means for determining a bandwidth allocation ratio for output bandwidths in accordance with a used bandwidth ratio obtained by reference to each bandwidth used for each of said plurality of virtual paths from said bandwidth monitor means in accordance with a change of the Queue length in the cell stored within said cell storing means; and output bandwidth control means for controlling output of said respective cell storing means, in accordance with the bandwidth allocation ratio determined by said bandwidth allocation control means.

2. The bandwidth allocation system of claim 1, wherein said bandwidth allocation control means allocates an output bandwidth substantially greater than a used bandwidth with respect to said cell storing means if the increasing Queue length of the cell exceeds a predetermined value.

3. The bandwidth allocation system of a virtual path as set forth in claim 1, wherein an upper threshold of cell storing amount in said cell storing means is established, and said bandwidth allocation control means, referring to a bandwidth used for each virtual path from said bandwidth monitor means, determines a bandwidth allocation ratio of output bandwidths with a weight added thereto according to the used bandwidth ratio, when the Queue length of a cell within said cell storing means exceeds the upper threshold.

4. The bandwidth allocation system of claim 1, wherein an upper threshold of cell storing amount in said cell storing means is established, and said bandwidth allocation control means:

comprises Queue length upper threshold excess detecting means, monitoring the Queue length of a cell within said cell storing means, for supplying a detection signal when the increasing Queue length exceeds the upper threshold; and determines a bandwidth allocation ratio of output bandwidths with a weight added thereto according to a used bandwidth ratio obtained by reference to each bandwidth used for each of said plurality of virtual paths from said bandwidth monitor means, in response to the detection signal from said Queue length upper threshold excess detecting means.

5. The bandwidth allocation system of claim 1, wherein said bandwidth allocation control means allocates an output bandwidth substantially greater than a used bandwidth with respect to said cell storing means in which the increasing Queue length exceeds a predetermined value, and after providing said above-mentioned cell storing means with said substantially greater output bandwidth, surplus bandwidth allocation to said cell storing means is released when the Queue length of the cell in said cell storing means is reduced to a predetermined value.

6. A bandwidth allocation system of a virtual path for allocating bandwidths for a plurality of virtual paths in a communication network of asynchronous transfer mode, wherein a node in said asynchronous transfer mode network comprises:

bandwidth monitor means for calculating a bandwidth used for a virtual path by measuring a cell amount entered into each virtual path;

cell storing means for storing an input cell for each of said plurality of virtual paths;

bandwidth allocation control means for determining a bandwidth allocation ratio for output bandwidths in accordance with a used bandwidth ratio obtained by reference to each bandwidth used for each of said plurality of virtual paths from said bandwidth monitor means depending on a change of the Queue length in the cell stored within said cell storing means, and output bandwidth control means for controlling output of said respective cell storing means, in accordance with the bandwidth allocation ratio determined by said bandwidth allocation control means;

an upper threshold and a lower threshold of a cell storing amount in said cell storing means; and wherein said bandwidth allocation control means includes, bandwidth weight allocation control means for determining a bandwidth allocation ratio of output bandwidths, with weight added thereto according to a used bandwidth ratio obtained by reference to each bandwidth used for each of said plurality of virtual paths from said bandwidth monitor means, when the Queue length of a cell stored within said cell storing means exceeds the upper threshold, and bandwidth ratio allocation control means, after decision of the bandwidth allocation ratio by said bandwidth weight allocation control means and output control of said respective cell storing means by said output bandwidth control means, for determining a bandwidth allocation ratio of output bandwidths in accordance with a used bandwidth ratio obtained by reference to each bandwidth used for each of said plurality of virtual paths from said bandwidth monitor means, when the Queue length arrives at the lower threshold.

7. The bandwidth allocation system of claim 6, wherein said bandwidth allocation control means includes:

Queue length upper threshold excess detecting means, monitoring the Queue length of a cell stored within said cell storing means, for supplying a detection signal when the increasing Queue length exceeds the upper threshold;

bandwidth weight allocation control means for determining a bandwidth allocation ratio of output bandwidths, with weight added thereto according to a used bandwidth ratio obtained by reference to each bandwidth used for each of said plurality of virtual paths from said bandwidth monitor means, in response to the detection signal from said Queue length upper threshold excess detecting means;

Queue length lower threshold arrival detecting means, monitoring the Queue length of a cell stored within said cell storing means, for supplying a detection signal when the Queue length is reduced to the lower threshold, after determination of the bandwidth allocation ratio by said bandwidth weight allocation control means and output control of said respective cell storing means by said output bandwidth control means; and bandwidth ratio allocation control means for determining a bandwidth allocation ratio of output bandwidths in accordance with a used bandwidth ratio obtained by reference to each bandwidth used for each of said plurality of virtual paths from said bandwidth monitor means, in response to the detection signal from said Queue length lower threshold arrival detecting means.

8. The bandwidth allocation system of claim 6, wherein said bandwidth allocation control means includes:

Queue length upper threshold excess detecting means, monitoring the Queue length of a cell stored within said cell storing means, for supplying a detection signal when the increasing Queue length exceeds the upper threshold;

bandwidth weight allocation control means for determining a bandwidth allocation ratio of output bandwidths, with weight added thereto according to a used bandwidth ratio obtained by reference to each bandwidth used for each of said plurality of virtual paths from said bandwidth monitor means, in response to the detection signal from said Queue length upper threshold excess detecting means;

Queue length lower threshold arrival detecting means, monitoring the Queue length of a cell stored within said cell storing means, for supplying a detection signal when the Queue length is reduced to the lower threshold, after determination of the bandwidth allocation ratio by said bandwidth weight allocation control means and output control of said respective cell storing means by said output bandwidth control means;

bandwidth ratio allocation control means for determining a bandwidth allocation ratio of output bandwidths in accordance with a used bandwidth ratio obtained by reference to each bandwidth used for each of said plurality of virtual paths from said bandwidth monitor means, in response to the detection signal from said Queue length lower threshold arrival detecting means, and further comprising state control means for controlling a state of the Queue length of a cell within said cell storing means, the state of said cell storing means controller by said state control means is changed according to the detection results of said Queue length upper threshold excess detecting means and said Queue length lower threshold arrival detecting means; and said bandwidth weight allocation control means and said bandwidth ratio allocation control means judge whether determination processing of a bandwidth allocation ratio should be performed, with reference to the state of said cell storing means controlled by said state control means.

9. The bandwidth allocation system of claim 8, wherein said state control means stores identification information for identifying said cell storing means, information indicating whether the Queue length is reduced to the lower threshold after being equal to the upper threshold, in every identification information, and information indicating an output bandwidth.

10. A bandwidth allocation system of a virtual path that allocates bandwidths for a plurality of virtual paths in a communication network of asynchronous transfer mode, wherein a node in the asynchronous transfer mode network comprises:

a bandwidth monitor that calculates a bandwidth used for a virtual path by measuring a cell amount entered into each virtual path;

a cell stored buffer that stores an input cell for each of said plurality of virtual paths;

a bandwidth allocation control circuit that determines a bandwidth allocation ratio for output bandwidths in accordance with a used bandwidth ratio obtained by reference to each bandwidth used for each of said plurality of virtual paths from said bandwidth monitor depending on a change of the Queue length in the cell stored within said cell stored buffer; and an output bandwidth control circuit that controls output of said respective cell stored buffers, in accordance with the bandwidth allocation ratio decided by said bandwidth allocation control circuit.

11. The bandwidth allocation system of claim 10, wherein an upper threshold of a cell storing amount in said cell stored buffer is established, and said bandwidth allocation control circuit decides a bandwidth allocation ratio of output bandwidths, with weight added thereto according to a used bandwidth ratio obtained by reference to each bandwidth used for each of said plurality of virtual paths from said bandwidth monitor, when the Queue length of a cell stored within said cell stored buffer exceeds the upper threshold.

12. A method of allocating bandwidth in an asynchronous transfer mode, comprising:

(a) accessing current bandwidth information of a plurality of virtual paths in response to a first control signal;

(b) determining a bandwidth allocation ratio in accordance with a queue length of one of said plurality of virtual paths, wherein a bandwidth is weighted when said queue length exceeds a first threshold;

(c) calculating corresponding output bandwidths for said cell stored buffers in accordance with said bandwidth allocation ratio; and (d) generating said first control signal in accordance with said output bandwidths.

13. The method of claim 12, further comprising:

(e) detecting a state when said queue length is reduced to a second threshold;

(f) referring to a state control table in accordance with (e);

(g) changing a state of said one of said plurality of cell stored buffers;

(h) generating a second control signal in response to (g); and (i) releasing a surplus of output bandwidth in accordance with said second control signal.

14. The method of claim 12, where said bandwidth is weighted by multiplying current bandwidth by a parameter greater than one to increase available bandwidth to said cell stored buffer.

15. The bandwidth allocation system of claim 1, wherein said bandwidth allocation control means comprises a state control buffer coupled between a queue length upper threshold excess detecting circuit and a queue length lower threshold arrival detecting circuit.

16. The bandwidth allocation system of claim 15, wherein said state control buffer comprises a state control table that stores information of a cell stored buffer identifier describing unit, a cell stored buffer state registering unit, and a cell stored buffer output bandwidth control unit.

17. The bandwidth allocation system of claim 6, wherein said bandwidth allocation control means comprises a state control buffer coupled between said queue length upper threshold excess detecting means and a queue length lower threshold arrival detecting means.

18. The bandwidth allocation system of claim 17, wherein said state control buffer comprises a state control table that stores information of a cell stored buffer identifier describing unit, a cell stored buffer slate registering unit, and a cell stored buffer output bandwidth control unit.

19. The bandwidth allocation system of claim 10, wherein said bandwidth allocation control circuit comprises a state control buffer coupled between a queue length upper threshold excess detecting circuit and a queue long lower threshold arrival detecting circuit.

20. The bandwidth allocation system of claim 19, wherein said state control buffer comprises a state control table that stores information of a cell stored buffer identifier describing unit, a cell stored buffer state registering unit, and a cell stored buffer output bandwidth control unit.

* * * * *